United States Patent [19]

Nishikawa et al.

[11] 4,016,241

[45] Apr. 5, 1977

[54] PROCESS FOR REDUCING NITROGEN OXIDES FROM FLUE GAS

[75] Inventors: Eiichiroh Nishikawa, Ohi; Takuji Itoh, Sayama; Setsuo Kamiyama, Ohi, all of Japan

[73] Assignee: Toa Nenryo Kogyo Kabushiki Kaisha, Tokyo, Japan

[22] Filed: Sept. 16, 1975

[21] Appl. No.: 613,962

[30] Foreign Application Priority Data

Sept. 20, 1974 Japan ............................ 49-108417

[52] U.S. Cl. ................................................ 423/239
[51] Int. Cl.$^2$ ........................................ B01D 53/34
[58] Field of Search ............ 423/239, 213.5, 213.7; 60/301, 303

[56] References Cited

UNITED STATES PATENTS

| 3,867,507 | 2/1975 | Myerson | 423/239 |
| 3,896,616 | 7/1975 | Keith | 423/213.7 |

FOREIGN PATENTS OR APPLICATIONS

| 630,690 | 11/1961 | Canada | 423/239 |

*Primary Examiner*—G. O. Peters
*Attorney, Agent, or Firm*—B. O. Dimmick; Wayne Hoover

[57] ABSTRACT

Nitrogen oxides are removed from gas mixtures containing nitrogen oxides and oxygen by adding a reducing agent that is a $C_2$ to $C_6$ olefin or an aromatic hydrocarbon such as benzene or toluene, preferably butene-1, and contacting the mixture at 200° to 450° C with a catalyst comprising iridium or a compound thereof supported on a refractory carrier, preferably alumina.

5 Claims, No Drawings

PROCESS FOR REDUCING NITROGEN OXIDES FROM FLUE GAS

This invention relates to a process for removing nitrogen oxides from combustion effluents such as flue gases, wherein nitrogen oxides are catalytically reduced and removed by using an unsaturated hydrocarbon as the reducing agent.

Flue gases discharged from industrial plants, including the heating furnaces of electric power plants generally contain nitrogen oxides. It is considered that nitrogen oxides in these flue gases are generated by combustion of nitrogen compounds contained in the fuels or by a chemical reaction in which nitrogen in air is combined with oxygen during the combustion process. Nitrogen oxides per se are harmful to living bodies, and they are substances that cause undesirable photochemical reactions. Accordingly, various methods for removal of nitrogen oxides or prevention of generation of nitrogen oxides have heretofore been proposed. For example, methods for removing nitrogen oxides in flue gases by contacting flue gases with a reducing agent have been developed. These catalytic reduction methods are classified into (1) non-selective reduction methods and (2) selective reduction methods.

According to the non-selective reduction methods, nitrogen oxides are reduced and removed in the presence of a reduction catalyst by using carbon monoxide, hydrogen, methane or natural gas as a reducing agent. In these methods, however, oxygen in the flue gases must first be reduced completely before removal of nitrogen oxides is possible. Therefore, in those methods an amount of the reducing agent necessary for complete reduction of oxygen must be used in addition to the amount necessary for reduction of nitrogen oxides.

The selective reduction method is one in which nitrogen oxides alone are selectively reduced and removed in the presence of oxygen. A known selective reduction method is the method using ammonia as the reducing agent.

In the case of the non-selective reduction methods, if oxygen is present in exhaust gases, a large quantity of a reducing agent is necessary for reduction of oxygen. Therefore, when these methods are applied to the removal of nitrogen oxides from oxygen-rich exhaust gases, such as ordinary flue gases, great expense is required for reducing agents, which is not desirable from the industrial viewpoint. The selective reduction method using ammonia has the disadvantage that at high temperatures ammonia is oxidized to form nitrogen oxides and if excessive ammonia is discharged in open air, this ammonia becomes another source of air pollution.

In accordance with the present invention, it has now been found that when an unsaturated hydrocarbon is used as the reducing agent in the presence of an iridium catalyst in catalytic reduction and removal of nitrogen oxides in flue gases, nitrogen oxides can be removed effectively even in the presence of a large quantity of oxygen by use of a very small amount of the reducing agent.

Flue gases that are effectively treated according to the process of this invention are combustion effluents discharged from heating furnaces of electric power plants and other industrial plants, and generated when fuels such as coal, petroleum fuel oils and residual oils are burnt with air. A large quantity of oxygen is present in such flue gas, because air is excessively used for combustion. For example, flue gases generally contain about 2 to about 10% by volume of oxygen. Contents of nitrogen oxides vary depending on the nitrogen compound content in fuel, the combustion temperature, the combustion method, the combustion apparatus or the like, but in general, nitrogen oxides are contained in flue gases at concentrations of about 80 to about 2,000 ppm, and 0 to about 100 ppm of sulfur oxides are generally contained in the flue gases.

The iridium catalyst to be used in this invention comprises an iridium component, optionally with a cocatalytic component, deposited on a refractory carrier. The iridium component is an active component composed of metallic iridium and/or an iridium compound such as iridium oxide, and the intended reduction reaction of this invention is sufficiently advanced if the iridium component is deposited in an amount of about 0.001 to about 5% by weight, as the metal, based on the total catalyst. As the cocatalytic component, there can be employed at least one member selected from metals of Group Ib of the Periodic Table, such as copper, silver and gold, and the cocatalytic component is incorporated in an amount of about 0.001 to about 5% by weight as the metal. If the component of a metal of Group Ib of the Periodic Table is thus combined with the iridium component, the activity of reducing nitrogen oxides in the presence of oxygen can be further enhanced. In addition, an alkali metal component or an alkaline earth metal component and a metal of Group VIb of the Periodic Table may be added in an amount of about 0.001 to about 5% by weight. The alkali metal component includes lithium, sodium and potassium among metals of Group Ia of the Periodic Table, the alkaline earth metal component includes magnesium, calcium, strontium and barium among metals of Group IIa of the Periodic Table. The component of the metal of Group VIb of the Periodic Table includes chromium, tungsten and molybdenum.

Any refractory substance can be used as the carrier in this invention. For example, there may be employed one or more of alumina, silica, magnesia, zirconia, hafnia, titania, thoria, boria, diatomaceous earth and active carbon. Use of a porous carrier is especially preferred. A most preferred carrier is alumina, to which silica, magnesia, boria, zirconia or other refractory inorganic oxide is added as a stabilizer to alumina in a small amount.

An alumina carrier preferably employed in this invention may be prepared according to a known method. It is preferred that an acid or an alkali be added to a solution of an aluminum compound to form alumina hydrate and aging be conducted under such conditions that porous alumina can be obtained.

Any method may be employed for depositing the iridium component on a refractory inorganic oxide carrier. In one method an aqueous solution of an iridium compound is added to an aqueous solution of an aluminum compound to coprecipitate the two components. In another method an aqueous solution of an iridium compound is added to a gel of a carrier. A most preferred method is one in which a carrier is contacted with or immersed in an aqueous solution of an iridium compound to thereby impregnate the carrier with the iridium compound.

More specifically, according to this preferred method, the carrier is first impregnated with an aqueous solution of an iridium compound, the aqueous solution is then separated from the carrier, and the impregnated carrier is washed, dried and calcined. Drying is conducted at a temperature in the range of about 50° to about 300° C, preferably at about 80° to about 150° C, and calcination is conducted at about 300° to about 800° C, preferably at about 500° to about 700°C.

The soluble iridium compounds to be used in the iridium impregnation step for preparing an iridium catalyst include, for example, inorganic salts such as iridium chloride, chloroiridic acid, iridium nitrate, iridium sulfate, ammonium chloroiridate, sodium chloroiridate and potassium chloroiridate, and organic salts such as acetylacetone complex salts and amine salts. A most preferred iridium compounds is sodium hexachloroiridate or potassium hexachloroiridate.

The component of a metal of Group Ib of the Periodic Table may similarly be deposited on the carrier by impregnation of a soluble compound thereof. As the soluble compound, there are preferably employed copper nitrate, copper sulfate, copper chloride, copper acetate, silver nitrate, silver chlorate, silver perchlorate, silver acetate, silver sulfate, silver nitrite, chloroauric acid gold chloride, sodium chloroaurate, potassium chloroaurate and ammonium chloroaurate.

Alkali metal and alkaline earth metal components may also be deposited according to the impregnation method by using hydroxides, chlorides, nitrates and carbonates.

The component of a metal of the Group VIb of the Periodic Table may similarly be deposited according to the impregnation method, and impregnation solutions prepared by dissolving, in water, nitrates, chlorides, hydroxides, carbonates or the like are employed.

The cocatalytic component may be impregnated simultaneously with the iridium component, or it may be deposited before or after deposition of the iridium component. After deposition of the iridium and cocatalytic component, the carrier is dried at about 50° to about 300° C and calcined at about 300° to about 800° C.

It is preferred that the catalyst used in this invention be molded in a form having a large area for contact with a flue gas and allowing easy passage of the flue gas. For example, it is preferred that the catalyst be molded in a spherical, cylindrical or tablet form of sufficient mechanical strength.

The most characteristic feature of this invention is that in catalytic reduction and removal of nitrogen oxides in flue gases, an unsaturated hydrocarbon is used as the reducing agent. As the unsaturated hydrocarbon, there can be employed one or more of lower olefinic hydrocarbons, for example, olefinic hydrocarbons having 2 to 6 carbon atoms. More specifically, ethylene, propylene, butene, isobutene, pentene, isopentene, hexene and isohexene are used singly or in the form of mixtures thereof (for example, $C_4$ and $C_5$ mixed fractions). Further, aromatic hydrocarbons such as benzene and toluene may be used. A most preferred unsaturated hydrocarbon reducing agent to be used in this invention is butene or a butene mixture (for example, $C_4$ fraction). Such reducing agents can be obtained in large amounts by thermal cracking of petroleum hydrocarbons, and therefore, the process of this invention using such reducing agent is very advantageous from the economic and industrial viewpoints.

The desired reduction in nitrogen oxides can be attained sufficiently when the unsaturated hydrocarbon reducing agent is added in a very small amount. Namely, if the reducing agent is added in an amount of up to about 1/20 mole % based on oxygen present in the flue gas, nitrogen oxides can be effectively reduced and removed. When the reducing agent is added in an amount exceeding 1/20 mole %, based on oxygen present, the unreacted reducing agent is discharged and hence, a post treatment should be conducted. In short, in this invention, the unsaturated hydrocarbon is added in an amount of about 0.1 to 20 moles, preferably 0.5 to 15 moles, per mole of the nitrogen oxide $NO_x$ (in which $x$ is 1 or 2), when the oxygen content in the exhaust gas is within a range of from about 3 to about 7%.

The catalytic reduction of nitrogen oxides may be performed under the following conditions; a reaction temperature within the range of about 200° to about 450° C, preferably about 300° to about 400° C and a gas space velocity of about 10,000 to about 100,000 V/H/V, preferably about 20,000 to about 40,000 V/H/V. The reaction is generally carried out under atmospheric pressure, but this condition is not particularly critical.

In the practice of this invention, when an unsaturated hydrocarbon is used as a reducing agent in the presence of an iridium catalyst, nitrogen oxides can be selectively reduced and removed even when a large quantity of oxygen is contained in a flue gas to be treated. The conventional method using a saturated hydrocarbon as a reducing agent is a non-selective reduction method in which a large quantity of the reducing agent is required in order to consume oxygen completely. In contrast, according to this invention, by using an unsaturated hydrocarbon as the reducing agent, the amount of the reducing agent necessary for the reduction can be greatly reduced. Accordingly, the process of this invention is much advantageous over the conventional process using a saturated hydrocarbon type reducing agent with respect to the cost of the reducing agent.

Also, since the reducing agent to be used in this invention is converted to harmless carbon dioxide gas and water by combustion, there is not brought about a problem that the unreacted reducing agent becomes another source of environmental pollution. Furthermore, the reducing agent to be used in the process of this invention is hardly poisoned by sulfur oxides in the flue gas, and hence, nitrogen oxides can be reduced smoothly even in the presence of sulfur oxides. Further, no deleterious by-product is formed by the reduction reaction, and no particular post treatment is required for disposal of by-products. Accordingly, this invention is industrially advantageous and makes great contributions to prevent environmental pollution.

EXAMPLE 1 (INCLUDING COMPARATIVE RESULTS)

A reaction tube was packed with an iridium-alumina catalyst prepared by immersing a commercially available alumina carrier in an aqueous solution of potassium chloroiridate so that iridium was impregnated in the carrier in an amount of 0.1% by weight, then waterwashing and drying the carrier, and calcining the dried carrier at 500°C.

For comparison purposes, another tube was packed with a platinum-alumina catalyst prepared by immersing a commercially available alumina carrier in an aqueous solution of chloroplatinic acid chloride to form a catalyst containing 0.1% by weight of platinum.

Butene-1 as a reducing agent for nitrogen oxides was added to a synthetic flue gas of the following composition prepared by mixing the indicated gases.

| Composition of Flue Gas (based on volume) | | | | |
|---|---|---|---|---|
| NO | $CO_2$ | $H_2O$ | $O_2$ | $N_2$ |
| 250 ppm | 10 % | 10 % | 3 % | balance |

The mixture of butene-1 and flue gas was passed through the catalyst bed using a catalyst amount of 10 g and a gas space velocity of 30,000 V/H/V. The amount of reducing agent used, the reaction temperature, and the test results are given in Table 1. Comparative results with the platinum catalyst are also given in Table 1.

Table 2

Results of Evaluation of $NO_x$ Reducing Activity

| Catalyst | $NO_x$ Removal Ratio (%) Oxygen Concentration in Exhaust Gas/Theoretical Oxygen Concentration | | | |
|---|---|---|---|---|
| | 0.45 | 1.0 | 1.2 | 1.6 |
| iridium catalyst | 42 | 94 | 77 | 56 |
| platinum catalyst (comparison) | 18 | 50 | 18 | 3 |

From the test results shown in Table 1 and in Table 2, it is apparent that the catalyst of this invention has an especially high reduction effect in an atmosphere containing oxygen in excess and when the catalyst of this invention is used, nitrogen oxides can be selectively reduced and removed adding a small amount of reduc- Table 1

Reduction and Removal of $NO_x$ in Flue Gas

| Catalyst | Reducing Agent | Concentration (%) of Reducing Agent | Oxygen Concentration in Flue Gas/Theoretical Oxygen Concentration* | Reaction Temperature (°C) | $NO_x$ Removal Ratio (%) | Reducing Agent Removal Ratio |
|---|---|---|---|---|---|---|
| iridium catalyst | butene-1 | 0.04 | 12.5 | 335 | 80 | 93 |
| " | " | 0.10 | 5 | 350 | 80 | 97 |
| platinum catalyst (comparison) | " | 0.04 | 12.5 | 275 | 40 | 88 |
| " | " | 0.04 | 12.5 | 335 | 26 | 98 |
| " | " | 0.50 | 1 | 350 | 80 | 89 |

*By the term "theoretic oxygen concentration" is meant a theoretical amount necessary for complete combustion of the reducing agent added to the flue gas.

EXAMPLE 2 (INCLUDING COMPARISON RESULTS)

Tests were also made to compare the $NO_x$ reducing activity of the two catalysts on a representative automobile exhaust gas containing 400 ppm of propene. The gas mixture contained:

$NO_x = 1,500$ ppm, $CO = 1.0\%$, $C_3H_6 = 400$ ppm $CO_2 = 10\%$, $H_2 = 0.5\%$, $H_2O = 10\%$, $O_2 = 0.42 - 1.5\%$ $N_2 =$ balance Reaction conditions were as follows:
Amount of Packed Catalyst = 10 g
Gas Space Velocity = 30,000 V/H/V
Reaction Temperature = 500° C The results obtained are shown in Table 2. In that table, by the term "theoretical oxygen concentration" is meant the theoretical amount of oxygen necessary for complete combustion of CO, $C_3H_6$ and $H_2$ present in the exhaust gas. In these tests, the theoretical oxygen concentration was 0.93%.

ing agent even if oxygen is contained in the flue gas or the exhaust gas in a large amount.

EXAMPLE 3 (INCLUDING COMPARISONS)

The iridium-alumina catalyst described in Example 1 was used for purification of a flue gas into which an unsaturated hydrocarbon was incorporated as a reducing agent, and the activity of reducing and removing nitrogen oxides was evaluated. Several runs were made using benzene in one case and a lower olefin in the other cases. Runs were also made to evaluate comparative reducing agents, i.e. CO, hydrogen, and n-butane. The results are given in Table 3.

The flue gas composition and reaction conditions were the same as in Example 1, using an optimum temperature in each case. The theoretical amount (A), %, of the reducing agent necessary for complete consumption of 3% $O_2$ and the amount (B), %, of the reducing agent necessary for reducing 70% of 250 ppm nitrogen oxides were determined, and the selectivity (B/A) of the conversion reaction of nitrogen oxides was evaluated.

Table 3

$NO_x$ Removal in Flue Gas

| Reducing Agent | Reaction Formula | | Theoretical Amount (A), %, of Reducing Agent Necessary for Complete Consumption of 3% $O_2$ | Theoretical Amount, %, of Reducing Agent Necessary for Complete Reduction of 250 ppm $NO_x$ | Optimum Temperature (°C.) | Amount (B), %, of Reducing Agent Necessary for Reduction of 70% of $NO_x$ | B/A |
|---|---|---|---|---|---|---|---|
| ethylene | $6NO+C_2H_4$ | $3N_2+2H_2O+2CO_2$ | 1.0 | 0.0042 | 350 | 0.075 | 0.075 |
| propylene | $9NO+C_3H_6$ | $9/2N_2+3H_2O+3CO_2$ | 0.667 | 0.0028 | 350 | 0.05 | 0.075 |
| butene-1 | $12NO+C_4H_8$ | $6N_2+4H_2O+4CO_2$ | 0.5 | 0.0021 | 350 | 0.035 | 0.07 |
| isobutylene | $12NO+C_4H_8$ | $6N_2+4H_2O+4CO_2$ | 0.5 | 0.0021 | 375 | 0.16 | 0.32 |
| pentene | $15NO+C_5H_{10}$ | $15/2N_2+5H_2O+5CO_2$ | 0.4 | 0.0017 | 350 | 0.09 | 0.225 |

Table 3-continued

| Reducing Agent | Reaction Formula | | NO$_x$ Removal in Flue Gas | | | | |
|---|---|---|---|---|---|---|---|
| | | | Theoretical Amount (A), %, of Reducing Agent Necessary for Complete Consumption of 3% O$_2$ | Theoretical Amount, %, of Reducing Agent Necessary for Complete Reduction of 250 ppm NO$_x$ | Optimum Temperature (° C.) | Amount (B), %, of Reducing Agent Necessary for Reduction of 70% of NO$_x$ | B/A |
| benzene | 15NO+C$_6$H$_6$ | 15/2N$_2$+3H$_2$O+6CO$_2$ | 0.4 | 0.0017 | 375 | 0.07 | 0.175 |
| n-butane (Comparison 1) | 13NO+C$_4$H$_{10}$ | 13/2N$_2$+5H$_2$O+4CO$_2$ | 0.461 | 0.0019 | 500 | 0.3 (10 % Reduction) | 0.65 |
| CO (Comparison 2) | NO+CO | 1/2N$_2$+CO$_2$ | 6.0 | 0.025 | 370 | 1.2 | 0.20 |
| H$_2$ (Comparison 3) | NO+H$_2$ | 1/2N$_2$+H$_2$O | 6.0 | 0.025 | 370 | 3.8 | 0.635 |

From the results shown in Table 1, it is apparent that an especially high nitrogen oxide reduction effect can be obtained in an atmosphere containing oxygen in excess by the use of the iridium catalyst of this invention. From the results of Example 3 shown in Table 3, it is apparent that when an unsaturated hydrocarbon such as an olefin having 2 to 6 carbon atoms or a fraction containing a mixture thereof or an aromatic hydrocarbon is used as the reducing agent for the catalyst system of this invention, the amount of the reducing agent to be incorporated can be greatly reduced and nitrogen oxides can be selectively reduced. Accordingly, it will readily be understood that the process of this invention is much advantageous over the conventional non-selective reduction method using CO, H$_2$ or natural gas as a reducing agent from the economical viewpoint, because the cost of the reducing agent can be greatly reduced.

What is claimed is:

1. A process for removing nitrogen oxides from a gas mixture containing nitrogen oxides and oxygen which comprises adding to said gas mixture a reducing agent selected from the group consisting of an olefin of 2 to 6 carbon atoms, benzene and toluene, said reducing agent being added in an amount of up to about 1/20 mole percent based on oxygen in the gas and an amount ranging between about 0.1 and about 20 moles per mole of nitrogen oxide, and contacting said mixture, at a temperature within the range of about 200° to 450° C, with a catalyst comprising iridium or a compound thereof supported on a refractory carrier.

2. A process as defined by claim 1 wherein said carrier comprises alumina.

3. A process as defined by claim 1 wherein the iridium or iridium compound is present on the carrier in an amount ranging from about 0.001 to about 5% by weight, as the metal, based on the total catalyst.

4. A process as defined by claim 1 wherein the catalyst includes a co-catalytic component, in an amount ranging from about 0.001 to about 5% by weight, as the metal, based on the total catalyst, wherein the co-catalyst is at least one metal or compound thereof selected from Group IB and Group VIB of the Periodic Table, alkali metals, and alkaline earth metals.

5. A process as defined by claim 1 wherein the reducing agent comprises butene-1.

* * * * *